(12) United States Patent
Black (10) Patent No.: US 7,481,013 B2
(45) Date of Patent: Jan. 27, 2009

(54) BILLBOARD SYSTEM AND METHOD (76) Inventor: John L. Black, 762 S. U.S. Hwy. 1, Vero Beach, FL (US) 32962

( * ) Notice: Subject to any disclaimer, the term of this patent is extended or adjusted under 35 U.S.C. 154(b) by 412 days.

(21) Appl. No.: 11/354,299

(22) Filed: Feb. 14, 2006

(65) Prior Publication Data
US 2006/0185205 A1   Aug. 24, 2006

Related U.S. Application Data (60) Provisional application No. 60/656,112, filed on Feb. 24, 2005.

(51) Int. Cl.
A47G 1/10 (2006.01)
A47G 1/08 (2006.01)
G09F 15/00 (2006.01)
G09F 17/00 (2006.01)
D06C 3/08 (2006.01)
F16M 11/26 (2006.01)
A47F 5/00 (2006.01)
F16B 9/00 (2006.01)
F16D 1/00 (2006.01)
F16D 1/08 (2006.01)

(52) U.S. Cl. ............... 40/624; 40/603; 40/741; 40/784; 248/188.5; 248/279.1; 38/102.5; 38/102.8; 403/236; 403/362

(58) Field of Classification Search ............ 40/603, 40/624, 741, 784, 604, 209, 792; 248/230.1, 248/230.7, 230.9, 295.11, 200.1, 188.4, 188.5, 248/157, 149, 150; 403/294, 306, 236, 362; 38/102.5, 102.8

See application file for complete search history.

(56) References Cited

U.S. PATENT DOCUMENTS

| | | | |
|---|---|---|---|
| 1,623,047 A | | 4/1927 | Cook |
| 2,116,844 A | | 5/1938 | Overholtz |
| 2,151,872 A | | 3/1939 | Rosner |
| 2,599,129 A | | 6/1952 | Michael et al. |
| 2,948,976 A | | 8/1960 | Miller, Jr. |
| 2,993,289 A | * | 7/1961 | Miller, Jr. et al. ............. 40/624 |
| 3,373,517 A | | 3/1968 | Halperin |
| 3,465,461 A | * | 9/1969 | Price et al. .................... 40/741 |
| 3,482,343 A | | 12/1969 | Hamu |
| 3,934,365 A | | 1/1976 | Stein et al. |
| 4,372,071 A | | 2/1983 | Vicino |
| 4,862,615 A | | 9/1989 | Hillstrom |

(Continued)

Primary Examiner—Paul N Dickson
Assistant Examiner—Syed A Islam
(74) Attorney, Agent, or Firm—Allen, Dyer, Doppelt, Milbrath & Gilchrist, P.A.

(57) ABSTRACT

A billboard sign includes abutting rectangular tubular sections forming a frame using a rectangular tube extending across abutting ends within the tubular sections. The rectangular tube is biased against adjacent inside wall surfaces of the tubular sections for securing and aligning the tubular sections to each other. Risers extend between opposing horizontal frame sections and define a flat riser plane. Stringers are attached to support posts and define a vertically oriented plane. With risers defining the flat riser plane, the stringers horizontally attached to support posts and aligned for defining a vertically oriented plane, the flat riser plane can be aligned with the vertically oriented plane for securing the frame to the support posts in a flat plane of the frame vertically oriented as desired, regardless of the orientation of the support posts. A flexible substrate may be extended across a periphery of the frame with a message carrying surface.

51 Claims, 7 Drawing Sheets

U.S. PATENT DOCUMENTS

| | | | |
|---|---|---|---|
| 4,922,988 A * | 5/1990 | Loomis ................ 160/368.1 |
| 5,020,254 A | 6/1991 | Sheppard |
| 5,398,436 A | 3/1995 | Suzuki |
| 6,041,535 A | 3/2000 | Holloway et al. |
| 6,167,649 B1 | 1/2001 | Palmeri |
| 6,508,024 B1 | 1/2003 | Hale |
| 6,594,932 B2 | 7/2003 | Hurst, Jr. et al. |
| 6,691,444 B2 | 2/2004 | Doone |
| 2003/0200685 A1 | 10/2003 | Gibb |

* cited by examiner

BILLBOARD SYSTEM AND METHOD

CROSS-REFERENCE TO RELATED APPLICATION

This application claims the benefit of U.S. Provisional Application No. 60/656,112 for "Billboard System and Method" having filing date Feb. 24, 2005, the disclosure of which is incorporated herein by reference in its entirety, and commonly owned.

FIELD OF THE INVENTION

The present invention generally relates to billboard advertising structures and in particular to a billboard frame and installation for providing a desirable orientation and advertising presentation media.

BACKGROUND OF THE INVENTION

The traditional billboard typically includes multiple upright posts having wallboard attached for covering the wallboard with advertising indicia. In the interest of reducing labor costs and improving the advertising surfaces carrying the advertising, a vinyl cover is often used for covering the wallboard and carrying advertising indicia on a viewable surface of the vinyl cover. While this may have addressed the problem of billboard appearance, storms continue to damage billboards, causing the wallboard as well as the vinyl cover to be thrown dangerously from the billboard site. Further, attempts to repair the billboard typically require realigning uprights imbedded in the ground, replacing wallboard, or repairing the wallboard to a degree that a vinyl cover can be attached.

There is a need for a billboard system and structure that effectively deals with the hazards resulting from violent storms damaging the traditional billboard and neighboring structures. Further, there is a need to eliminate safety concerns resulting from billboard debris being thrown dangerously about by violent winds. Yet further, there is a need to provide an effective structure and installation method for having a sign carried in a vertical and horizontal orientation for a desirable presentation of its advertising indicia.

SUMMARY OF THE INVENTION

The present invention provides a billboard and method of installation for the billboard having a frame that may be desirably oriented for carrying advertising on a cover. A billboard sign may include abutting rectangular tubular sections forming a frame using a rectangular tube extending across abutting ends within the tubular sections. The rectangular tube is biased against adjacent inside wall surfaces of the tubular sections for securing and aligning the tubular sections to each other. Risers extend between opposing horizontal frame sections and define a flat riser plane. Stringers are attached to support posts and define a vertically oriented plane. With risers defining the flat riser plane, the stringers horizontally attached to support posts and aligned for defining a vertically oriented plane, the flat riser plane can be aligned with the vertically oriented plane for securing the frame to the support posts in a flat plane of the frame vertically oriented as desired, regardless of the orientation of the support posts. A flexible substrate may be extended across a periphery of the frame with a message carrying surface.

One embodiment of the invention ay include a frame having a plurality of opposing horizontal and vertical frame sections defining a periphery thereof, a front side of the frame defining a flat plane, wherein at least one of the frame sections comprises first and second tubular portions having ends positioned in a longitudinally abutting relation for forming the at least one frame section, wherein each of the first and second tubular portions has a similar rectangular cross section, an elongate member having a rectangular outside dimension for being received within the first and second tubular portions, the elongate member carried within the first and second tubular portions and extending across the ends thereof, and biasing means for biasing the elongate member against adjacent inside wall surfaces of each of the first and second tubular portions, thus a securing and aligning thereof.

Another embodiment may include a frame having a plurality of opposing horizontal and vertical frame sections defining a periphery thereof, a front side of the frame defining a flat plane, at least two riser members extending generally vertically between the opposing horizontal frame sections, the at least two riser members having surfaces defining a flat riser member plane, a support, and at least two stringer members carried generally horizontally by the support, wherein the at least two stringer members are aligned for defining a vertically oriented plane, wherein the flat riser member plane is aligned with the vertically oriented plane, thus securing the frame to the support with the flat plane being vertically oriented.

Such an embodiment may further include a flexible substrate extending across the periphery of the frame, wherein a message carrying surface of the flexible substrate faces outwardly from the front side of the frame. The periphery of the flexible substrate may further extend across the periphery of the frame to a backside thereof. Further, a plurality of tensioning elements may be carried about the periphery of the frame and operable with the flexible substrate for a stressing thereof, thus providing a generally smooth planar message carrying surface defined by the frame. Support may include generally vertically arranged posts extending downwardly into a supporting surface and upwardly along the back side of the frame.

Method aspects of the invention may include providing a frame having opposing horizontal and vertical frame sections defining a periphery thereof, the front side of the frame defining a flat plane, attaching at least two riser members between the opposing horizontal frame sections such that the at least two riser members define a flat riser member plane, attaching at least two stringer members to a support, and aligning the at least two stringer members for defining a vertically oriented plane, and aligning the flat riser member plane with the vertically oriented plane, thus securing the frame to the support with the flat plane being vertically oriented.

Further, methods may include extending a flexible substrate across the periphery of the frame, wherein a message carrying surface of the flexible substrate faces outwardly from the front side of the frame. Yet further, a plurality of tensioning elements may be placed about the periphery of the frame and connected to the flexible substrate for a stressing thereof, thus providing a generally smooth planar message carrying surface defined by the frame. A plurality of posts may be embedded downwardly into a supporting surface and upwardly along the back side of the frame for providing the support.

Fabrication of the frame may further include providing first and second tubular portions for forming at least one of the horizontal and vertical frame sections, positioning the first and second tubular portions for a longitudinally abutting relation for forming the at least one frame section, wherein each of the first and second tubular portions has a similar rectangular cross section, extending an elongate member into the first and second tubular portions, the elongate member having a rectangular outside dimension, extending the elongate member across abutting ends of the first and second tubular portions, and biasing the elongate member against adjacent inside wall surfaces of each of the first and second tubular portions, thus a securing and aligning thereof.

As will be further detailed, by way of example, embodiments of the invention may include a generally rectangular shaped frame having squared corners and parallel opposing sides presenting a uniform shape around which a flexible substrate such as vinyl cover may be attached for carrying advertising indicia. Stringer members may be horizontally arranged and leveled for locating a sign reference location, wherein risers formed with the frame are connected to the stringers. The frame may be assembled on site and may be assembled on the ground before lifting into place and attaching the risers of the frame to the stringers. Turnbuckle styled hooks may be used to provide tension to and stretch the vinyl about the frame. By way of example, the teachings of the present invention allow for a desirable advertising billboard installation on existing uprights that may not be desirably vertically oriented.

BRIEF DESCRIPTION OF THE DRAWINGS

Embodiments of the invention are described by way of example with reference to the accompanying drawings in which.

Sample embodiment sheets 1 and 2 illustrate one arrangement of a billboard embodiment in keeping with the teachings of the present invention.

DETAILED DESCRIPTION OF THE PREFERRED EMBODIMENTS

The present invention will now be described more fully hereinafter with reference to the accompanying drawings, in which embodiments of the invention are shown by way of illustration and example. This invention may, however, be embodied in many forms and should not be construed as limited to the embodiments set forth herein. Rather, these embodiments are provided so that this disclosure will be thorough and complete, and will fully convey the scope of the invention to those skilled in the art.

Figure 1:
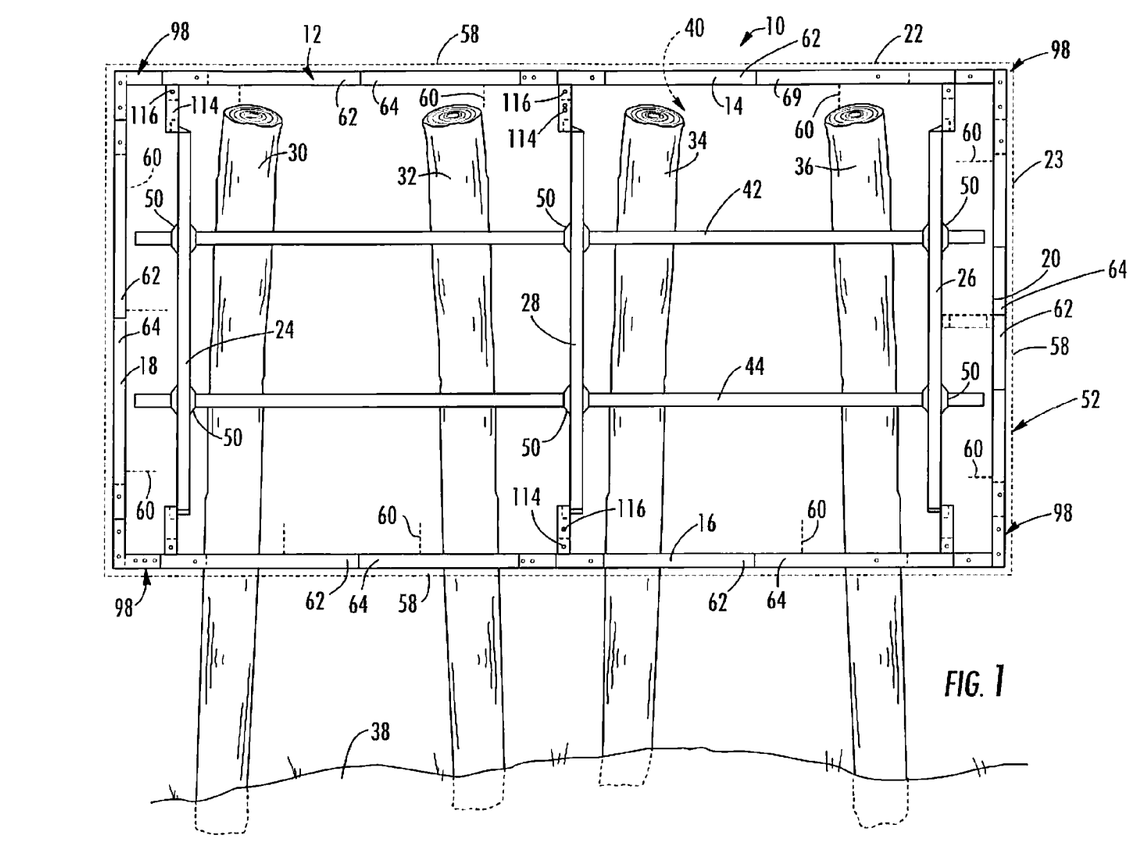
FIG. 1 is a partial front elevation view of a billboard sign embodiment formed in keeping with the teachings of the present invention.
Figure 2:
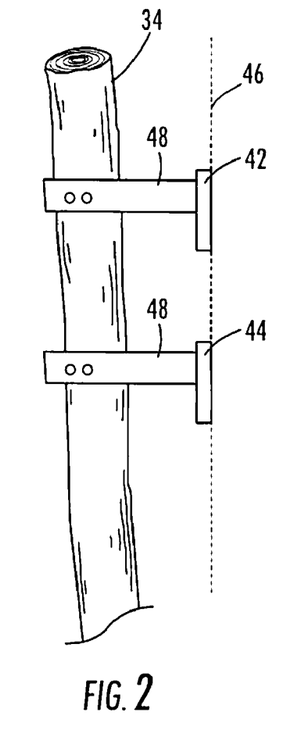
FIGS. 2 and 3 are partial side elevation views illustrating an embodiments of stringer members secured to support posts.
Figure 3:
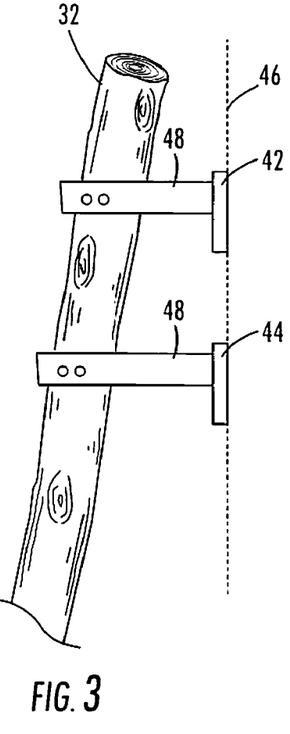

With reference initially to FIG. 1, one embodiment of the present invention may be described as a billboard sign 10 comprising a frame 12 having generally parallel, opposing top and bottom horizontal frame sections 14, 16 and opposing left and right vertical frame sections 18, 20 defining a periphery 22 of the frame. The frame 12 defines a flat plane 23 on a front side thereof. For the embodiment of the sign 10 herein described, by way of example, left, right, and center riser members 24, 26, 28 extend generally vertically between the opposing top and bottom frame sections 14, 16. The riser members 24, 26, 28 have their rear surfaces 25 arranged defining a flat riser member plane 27, as illustrated with reference to FIG. 2. For the billboard sign 10 herein described, by way of example, a plurality of spaced apart, generally vertically arranged support posts 30, 32, 34, 36 extending downwardly into a supporting surface 38, such as being buried in the ground and upwardly along a back side 40 of the frame 12. With continued reference to FIGS. 1 and 2, upper and lower stringer members 42, 44 are each attached to the support posts, such as illustrated with reference to FIG. 2 for post 34, wherein the stringer members are positioned horizontally and spaced from the posts 30-36 so as to define a vertically oriented plane 46. The stringer members 42, 44 may be attached to the posts using bracing 48, or a structure well known to those skilled in the art. The bracing 48 is used to position the stringer members 42, 44 so as to establish the vertically oriented plane 46 whether one support post 34 is uniformly shaped and vertically extending, as illustrated by way of example with reference again to FIG. 2, or generally uneven and leaning, as illustrated with reference to FIG. 3.

Figure 4:
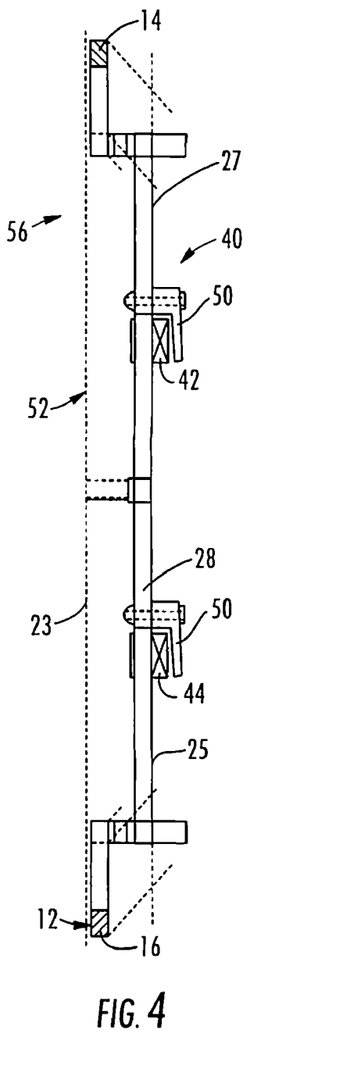
FIG. 4 is a partial right side elevation view of a frame portion of the embodiment of FIG. 1.

With continued reference to FIG. 1, and to FIG. 4, clips 50 are carried by the riser members 24, 26, 28 and attach the riser members to the upper and lower stringer members 42, 44, thus securing the frame 12 to the support posts 30-36.

Figure 5:
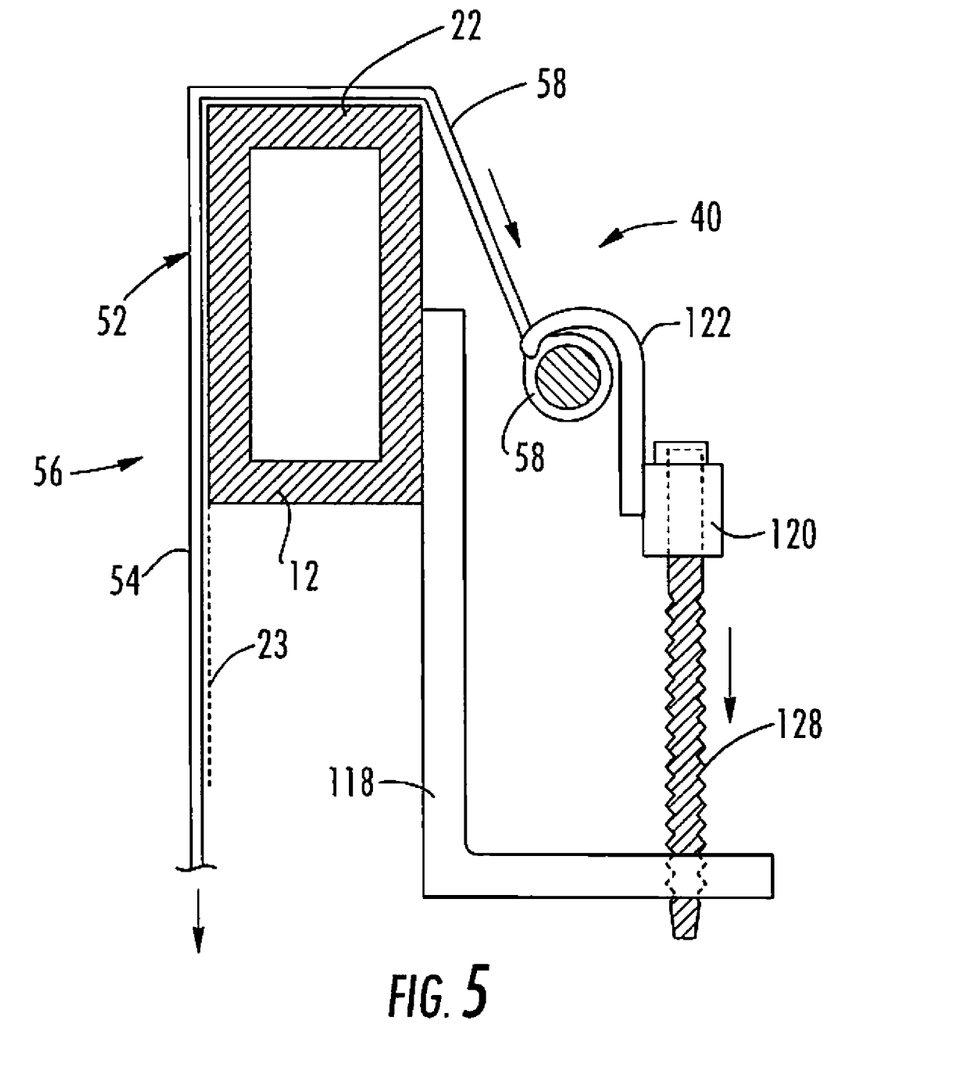
FIG. 5 is a partial side view of a peripheral portion of a frame including a tensioning element operable for stressing a flexible substrate carried by the frame.

As illustrated with reference again to FIGS. 1 and 4 in a dashed line for clearly viewing the sign structure, and to FIG. 5, a flexible substrate 52 such as a vinyl sheet extends across the periphery 22 of the frame 12, wherein a message carrying surface 54 faces outwardly from a front side 56 of the frame 12, and wherein a peripheral portion 58 of the flexible substrate 52 extends across the periphery 22 of the frame 12 to the frame backside 40. With continued reference to FIG. 5, and as will be further detailed later in this section, a plurality of tensioning elements 60 are arranged for stressing the flexible substrate 52 in mutually perpendicular horizontal and vertical directions, thus providing a planar message carrying surface 54 defined by desirably positioned horizontal and vertical sides.

Figure 6:
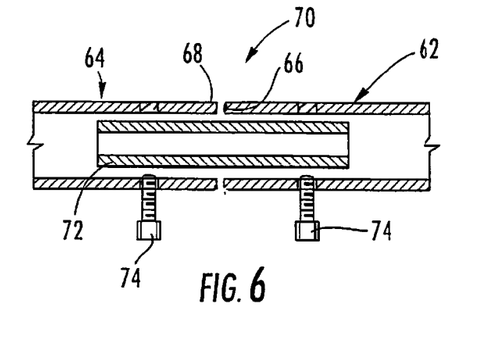
FIG. 6 is a partial cross sectional view illustrating one embodiment employing inside and outside tubing.
Figure 7:
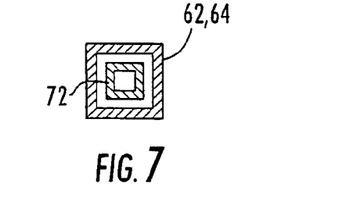
FIG. 7 is a cross sectional view transversely through tubing elements illustrating inside and outside tubing arrangements, by way of example.
Figure 8:
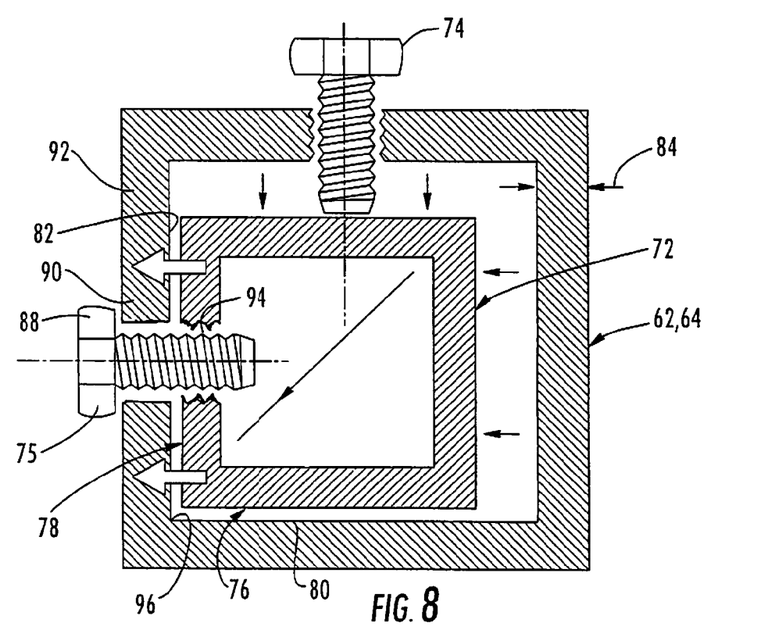
FIG. 8 illustrates by way of example one embodiment of inside and outside tubing having push and pull bolts for use in squaring the frame herein described.
Figure 9:
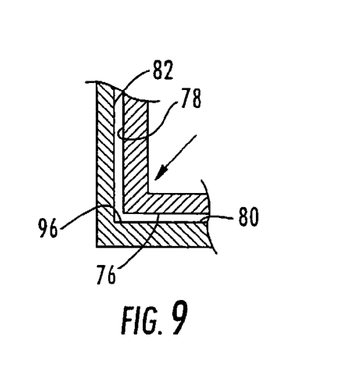
FIG. 9 is a partial enlarged view of one corner portion of the frame of FIG. 8.

With continued reference to FIG. 1, and to FIGS. 6-8, the frame sections 14, 16, 18, 20, as well as the stringer members 42 44 and riser members 24-28, by way of example, may be formed from multiple tubular portions, as herein described as including first and second tubular portions 62, 64 having ends 66, 68 positioned in a longitudinally abutting relation 70 for forming the frame section 14, 16, 18, 20, wherein each of the first and second tubular portions 62, 64 have a similar rectangular cross section, square as herein described by way of example. An elongate member 72 having a rectangular outside dimensional shape is received within the first and second tubular portions 62, 64, as illustrated with reference to FIGS. 6 and 7, and carried for extending across the ends 66, 68. For the embodiment herein described by way of example, and as illustrated with reference to FIGS. 6 and 7, threaded bolts 74 provide biasing means for securing adjacent outside surfaces 76, 78 of the elongate member 72 against adjacent side wall surfaces 80, 82 of each of the first and second tubular portions 62, 64, as further illustrated with reference to FIG. 9. With the tubular portions 62, 64 having a generally uniform wall thickness 84, as illustrated with reference again to FIG. 8, aligning the inside wall surfaces 80, 82 of the abutting tubular portions 62, 64 results in an aligning of the outside surfaces of the abutting tubular portions. The attaching of the elongate member 72 thus provides an alignment and an attachment of the first tubular portion 62 with the second tubular portion 64.

With continued reference to FIG. 8, one threaded bolt 74 may be threaded through one abutting wall 86 opposing the inside wall surface 80 of the first and second tubular sections 62, 64, wherein advancing the bolt 74 into the wall 86 causes the bolt to be biased against the elongate member 72 for forcing the elongate member surface 76 against the tubular portion surface 80. In a similar manner, a second bolt may be threaded through a tubular portion wall adjacent fro pushing against the elongate member and causing the outside wall surface 78 to be biased against the inside wall surface 80, or as illustrated with reference again to FIG. 8, the second bolt 88 may freely pass through a bore 90 in an adjacent abutting wall 92 extending through the adjacent abutting wall of the first and second tubular portions and extending into a threaded hole 94, wherein rotation of the bolt 88 causes the elongate member to be pulled toward the adjacent wall 92 for biasing the surfaces 78, 82 against each other. As herein described by way of example for rectangular tubing portions 62, 64 the adjacent side wall are perpendicular to each other, thus the elongate member 72, herein illustrated as a rectangular tube itself with the rectangular cross section a square cross section, is biased against an inside corner 96 of the abutting tubular portions 62, 64.

Figure 10:
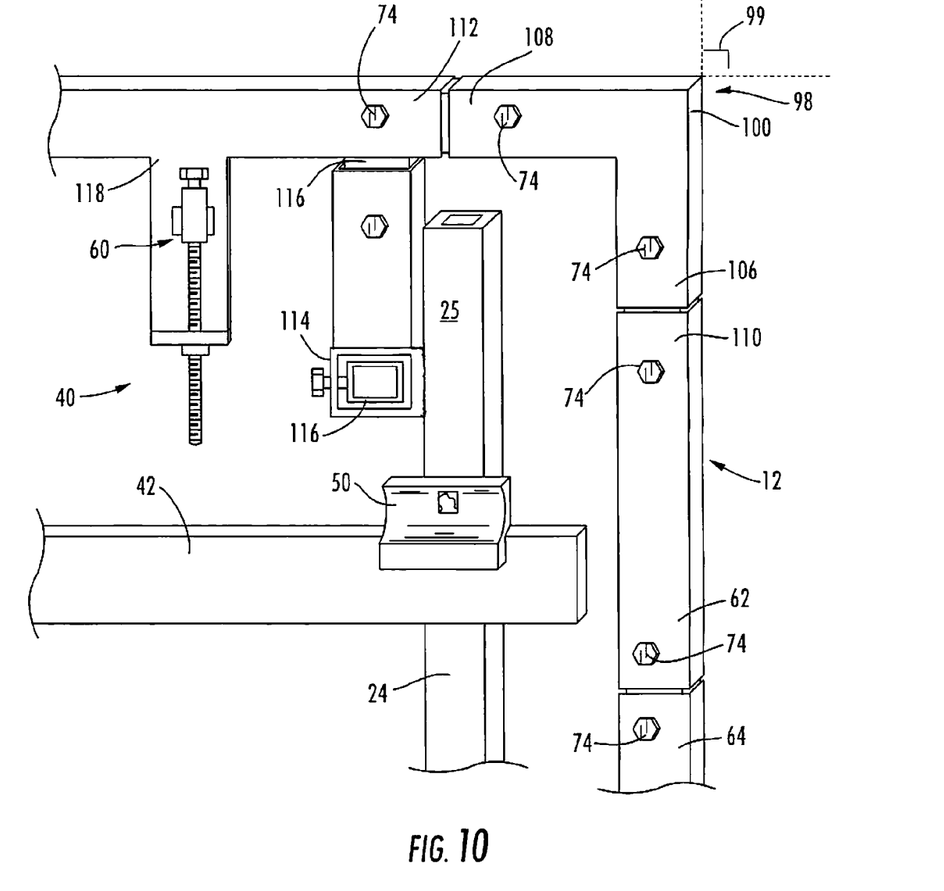
FIG. 10 is a partial elevation view of a left rear top corner portion of the frame of FIG. 1 illustrating one embodiment of a corner squaring bracket.
Figure 10A:
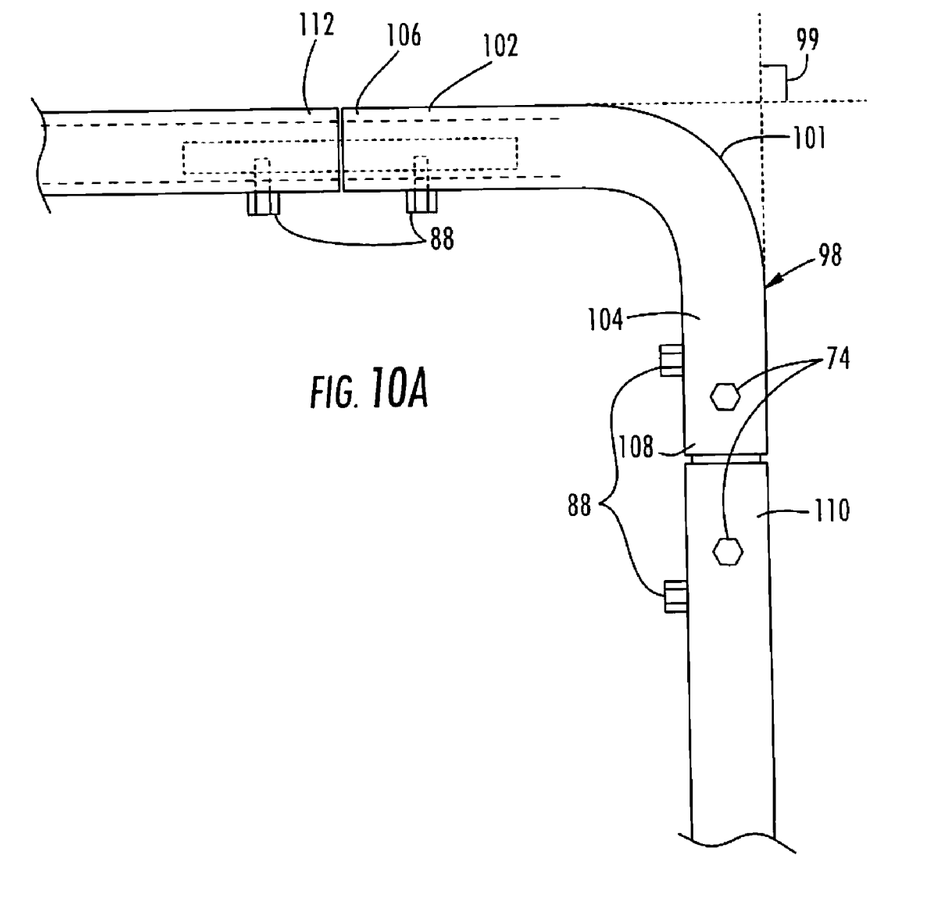
FIG. 10A is an alternate embodiment of the corner bracket of FIG. 10.

While a billboard sign 10 may typically have a rectangular shaped message carrying surface 54 for use in advertising, the frame 12 and structure as herein described may be used for a variety of frames as will come to the mind of those skilled in the art, now having the benefit of the teachings of the present invention. With reference again to FIG. 1, the frame 12 as herein described has a rectangular shaped periphery 22 with the horizontal top and bottom frame sections 14, 16 perpendicular to the left and right vertical frame sections 18, 20. A corner bracket 98 may define a square corner edge 100 for the frame 12, as further illustrated with reference to FIG. 10, wherein a ninety degree corner is formed for placing the horizontal frame sections 14, 16 perpendicular 99 to the vertical sections 18, 20. Alternatively, and as illustrated with reference to FIG. 1A, an arcuate corner 101 may be employed while meeting a requirement of perpendicular 99 relationship between the horizontal and vertical sections. For the embodiment herein described by way of example, the corner bracket 98 is formed from rectangular tubing similar in shape to the frame sections 14, 16, as above described with reference to FIGS. 6-8. Four corner brackets connect the horizontal and vertical frame sections to form the frame. The corner bracket 98 may be formed rigidly attaching a first tubular bracket arm 102 perpendicularly to a second tubular bracket arm 104 for forming the corner edge 100. Free ends 106, 108 of the tubular arms 102, 104 are abutting connected to free ends of tubular portions 110, 112 of the horizontal and vertical top, bottom, left, and right frame sections 14, 16, 18, 20, FIG. 10 illustrating one corner by way of example, and FIG. 1 illustrating the four corners of the rectangular frame. As above described with reference to FIGS. 6-8, an elongate member 72, is used to align and attach the corner brackets 98 to adjacent frame sections 16-20. In a similar manner, and as illustrated with continued reference to FIG. 10, other tubular members 114 may be attached to cooperating members 116 using the teachings of the present invention.

With the teachings of the present invention regarding a desirable aligning and attaching of tubular portions 62, 64, by way of example, generally straight frame sections 16-22 may be easily formed at an advertising site. With the front side 56 of the frame 12 defining the flat plane 23, the riser members 24, 26, 28 having surfaces 25 that define a flat riser member plane 27, the stringer members 42, 44 horizontally carried by the support posts 30-36 and are aligned for defining the vertically oriented plane 46, and the clips 50 used to attach the riser members 24, 26, 28 to the stringer members 42, 44, wherein the flat riser member plane 27 is aligned with the vertically oriented plane 46 result in the frame 12 being secured to the support posts 30-36 with the flat plane 23 vertically oriented as desired, regardless of the orientation of the support posts.

Figure 11:
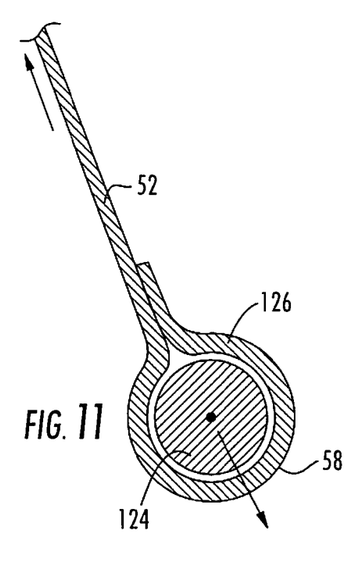
FIG. 11 is a partial cross sectional view illustrating a peripheral portion of a flexible substrate including a vinyl sheet and beading embodiment.
Figure 12:
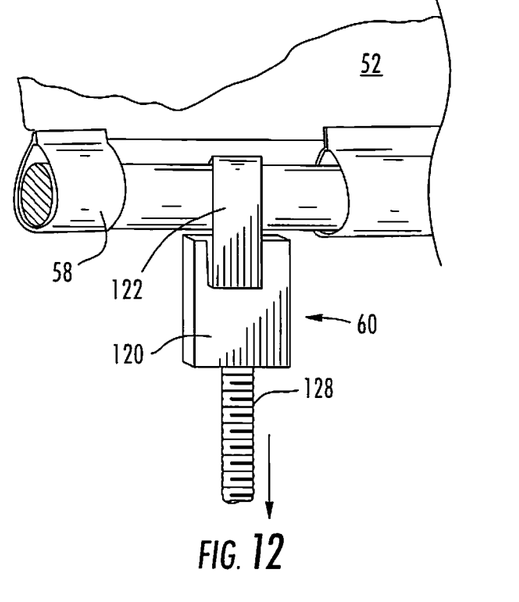
FIG. 12 is a partial perspective view of the tensioning element of FIG. 5 connected to a peripheral portion of the flexible substrate.

With reference again to FIGS. 5 and 10, and to FIGS. 11 and 12, one embodiment of the tensioning element 60, a plurality of which are positioned about the frame periphery 22 as illustrated with reference to the dashed lines 60 of FIG. 1, includes an L-shaped plate 118 secured to the frame 12, the horizontal and vertical sections as herein described. A sleeve 120 having a hook 122 is connected to the flexible substrate 52, herein including a peripheral rope or beading 124 carried within a looped end 126 of the flexible substrate 52, as illustrated with continued reference to FIGS. 11 and 12. An elongate threaded rod 128 engages the plate for longitudinal movement during a turning of the rod. The elongate rod 128 rotatably engages the sleeve 120. Screwing the rod 128 into the plate 118 advances the sleeve 120 longitudinally, thus providing a tensioning adjustment to the flexible substrate 52 about the periphery 58.

Depending upon a desired outside dimension fro the frame 12, multiple frame portions 62, 64 may be connected accordingly to provide a desired dimension of the frame. By positioning the stringer members 42, 44 on the upright post in a parallel manner within the vertical plane 46, the frame 12 may be attached to the stringer members using the clips 50 carried by the riser members 24-28 for positioning the frame 12 in a desirable orientation. While generally rigid tubular steel may be used in the fabrication of the frame 12, having lengthy top and bottom frame sections 14, 16 will cause the sections to flex. With such an arrangement, it will come to the mind of those skilled in the art that multiple riser members 24-28 will be used to accommodate such flexibility when attaching the frame to the stringer members 42, 44.

With the elements of the squared frame 12 as herein described by way of example, including the parallel and leveled stringer members 42, 44, riser members 24-26 of the frame 12 connected to the stringer members using the clips 50, and the vinyl advertising substrate 52 tensioned around the frame, a desirable and easily fabricated billboard sign results.

Although the invention has been described relative to specific embodiments thereof, there are numerous variations and modifications that will be readily apparent to those skilled in the art in light of the above teachings. It is therefore to be understood that, within the scope of the appended claims, the invention may be practiced other than as specifically described.

That which is claimed is:

1. An apparatus comprising:
   a frame having a plurality of opposing horizontal and vertical frame sections defining a periphery thereof, a front side of the frame defining a flat plane, wherein at least one of the frame sections comprises:
      first and second tubular portions having ends positioned in a longitudinally abutting relation for forming the at least one frame section, wherein each of the first and second tubular portions has a similar rectangular cross section;
      an elongate member having a rectangular outside dimension for being received within the first and second tubular portions, the elongate member carried within the first and second tubular portions and extending across the ends thereof; and
      biasing means for biasing the elongate member against adjacent inside wall surfaces of each of the first and second tubular portions, thus a securing and aligning thereof, wherein the biasing means comprise first and second threaded rods extending through first abutting side walls of the first and second tubular portions, the first and second threaded rods biasing a first wall surface of the elongate member against first inside surfaces of the abutting first and second tubular sections, and third and fourth threaded rods extending through a second side wall of the first and second tubular portions, the third and fourth threaded rods biasing a second wall surface of the elongate member against second inside surfaces of the abutting first and second tubular sections;
   at least two riser members extending generally vertically between the opposing horizontal frame sections, the at least two riser members having surfaces defining a flat riser member plane;
   a plurality of spaced, generally vertically arranged support posts extending downwardly into a supporting surface and upwardly along a back side of the frame;
   at least two stringer members carried generally horizontally by the plurality of support posts, wherein the at least two stringer members are aligned for defining a vertically oriented plane;
   a clip carried by each of the at least two riser members and attaching the at least two riser members to the at least two stringer members, wherein the riser member plane is aligned with the vertically oriented plane, thus securing the frame to the plurality of spaced, generally vertically arranged support posts with the flat plane being vertically oriented;
   a flexible substrate extending across a periphery of the frame, wherein a message carrying surface of the flexible substrate faces outwardly from the front side of the frame, and wherein a periphery of the flexible substrate extends across the periphery of the frame to the backside thereof; and
   a plurality of tensioning elements carried about the periphery of the frame and operable with the periphery of the flexible substrate for a stressing thereof in generally horizontal and vertical directions, thus providing a generally smooth planar message carrying surface defined by the frame.

2. An apparatus according to claim 1, wherein the tubular portions have a generally uniform wall thickness such that aligning inside walls of the longitudinally abutting frame sections results in an aligning of outside surfaces thereof.

3. An apparatus according to claim 1, wherein the first wall surface of the elongate member is adjacent the second wall surface thereof.

4. An apparatus according to claim 1, wherein the first wall surface of the elongate member is adjacent the second wall surface thereof so as to form a corner therebetween.

5. An apparatus according to claim 1, wherein the first wall surface of the elongate member is perpendicular to the second wall surface thereof.

6. An apparatus according to claim 1, wherein the first inside wall surfaces of the first and second tubular portions are adjacent the second inside wall surfaces thereof.

7. An apparatus according to claim 1, wherein the first inside wall surfaces of the first and second tubular portions are perpendicular to the second inside wall surfaces thereof.

8. An apparatus according to claim 1, wherein each of the threaded rods comprise bolts, the bolts engaging threaded bores within the tubular portions.

9. An apparatus according to claim 1, wherein the elongate member is tubular.

10. An apparatus according to claim 9, wherein the elongate member and the first and second tubular portions have a rectangular cross section.

11. An apparatus according to claim 10, wherein the rectangular cross section comprises a square cross section.

12. An apparatus according to claim 1, further comprising:
   the frame having a rectangular peripheral shape with the horizontal frame sections perpendicular to the vertical frame sections with each of the frame sections formed from rectangular tubing;
   a corner bracket defining a corner edge for the frame, the corner bracket formed from rectangular tubing similar in shape to the frame sections, wherein the corner bracket connects the horizontal and vertical frame sections cooperating to from a corner of the frame;
   a rod having a rectangular outside dimension for being received with the rectangular tubing of the corner bracket and the frame sections extends from the bracket to the frame section; and
   biasing means biasing the rod against adjacent inside walls of the bracket and frame section adjacent tubing, thus providing alignment and attachment of the horizontal and vertical frame sections to the corner bracket.

13. An apparatus according to claim 12, wherein the corner comprises a squared corner.

14. An apparatus according to claim 12, wherein the corner comprises an arcuate corner.

15. An apparatus according to claim 1, wherein each of the plurality of tensioning elements comprises:
   a plate secured to the frame;
   a sleeve having a hook thereon for connection to the flexible substrate;
   an elongate rod engaging the plate for longitudinal movement therewith, the elongate rod rotatably engaging the sleeve, wherein the elongate rod is threaded for advancing the sleeve longitudinally, thus providing a tensioning adjustment to the flexible substrate.

16. An apparatus comprising:
a frame having a plurality of opposing horizontal and vertical frame sections defining a periphery thereof, a front side of the frame defining a flat plane, wherein the frame sections comprise:
first and second tubular portions having ends positioned in a longitudinally abutting relation for forming the at least one frame section, wherein each of the first and second tubular portions has a similar rectangular cross section;
an elongate member having a rectangular outside dimension for being received within the first and second tubular portions, the elongate member carried within the first and second tubular portions and extending across the ends thereof; and
biasing means for biasing the elongate member against adjacent inside wall surfaces of each of the first and second tubular portions, thus a securing and aligning thereof, wherein the biasing means comprise first and second threaded rods extending through first abutting side walls of the first and second tubular portions, the first and second threaded rods biasing a first wall surface of the elongate member against first inside surfaces of the abutting first and second tubular sections, and third and fourth threaded rods extending through a second side wall of the first and second tubular portions, the third and fourth threaded rods biasing a second wall surface of the elongate member against second inside surfaces of the abutting first and second tubular sections;
at least two riser members extending generally vertically between the opposing horizontal frame sections, the at least two riser members having surfaces defining a flat riser member plane;
a support; and
at least two stringer members carried generally horizontally by the support, wherein the at least two stringer members are aligned for defining a vertically oriented plane, wherein the flat riser member plane is aligned with the vertically oriented plane, thus securing the frame to the support with the flat plane being vertically oriented.

17. An apparatus according top claim 16, further comprising a flexible substrate extending across the periphery of the frame, wherein a message carrying surface of the flexible substrate faces outwardly from the front side of the frame.

18. An apparatus according to clam 17, wherein a periphery of the flexible substrate extends across the periphery of the frame to a backside thereof.

19. An apparatus according to claim 17, further comprising a plurality of tensioning elements carried about the periphery of the frame and operable with the flexible substrate for a stressing thereof, thus providing a generally smooth planar message carrying surface defined by the frame.

20. An apparatus according to claim 16, wherein the support comprises a generally vertically arranged post extending downwardly into a supporting surface and upwardly along the back side of the frame.

21. An apparatus according to claim 16, further comprising a clip carried by each of the at least two riser members and attaching the at least two riser members to the at least two stringer members.

22. An apparatus according to claim 16, wherein the tubular portions have a generally uniform wall thickness such that aligning inside walls of the longitudinally abutting frame sections results in an aligning of outside surfaces thereof.

23. An apparatus according to claim 16, wherein the first wall surface of the elongate member is adjacent the second wall surface thereof.

24. An apparatus according to claim 16, wherein the first wall surface of the elongate member is adjacent the second wall surface thereof so as to form a corner therebetween.

25. An apparatus according to claim 16, wherein the first wall surface of the elongate member is perpendicular to the second wall surface thereof.

26. An apparatus according to claim 16, wherein the first inside wall surfaces of the first and second tubular portions are adjacent the second inside wall surfaces thereof.

27. An apparatus according to claim 16, wherein the first inside wall surfaces of the first and second tubular portions are perpendicular to the second inside wall surfaces thereof.

28. An apparatus according to claim 16, wherein the elongate member is tubular, and wherein the elongate member and the first and second tubular portions have a rectangular cross section.

29. An apparatus according to claim 16, further comprising:
the frame having a rectangular peripheral shape with the horizontal frame sections perpendicular to the vertical frame sections with each of the frame sections formed from rectangular tubing; and
a corner bracket defining a corner edge for the frame, the corner bracket formed from rectangular tubing similar in shape to the frame sections, wherein the corner bracket connects the horizontal and vertical frame sections cooperating to from a corner of the frame.

30. An apparatus comprising:
a frame having a plurality of opposing horizontal and vertical frame sections defining a periphery thereof, a front side of the frame defining a flat plane, wherein at least one of the frame sections comprises first and second tubular portions having ends positioned in a longitudinally abutting relation for forming the at least one frame section, wherein each of the first and second tubular portions has a similar rectangular cross section;
an elongate member having a rectangular outside dimension for being received within the first and second tubular portions, the elongate member carried within the first and second tubular portions and extending across the ends thereof; and
biasing means for biasing the elongate member against adjacent inside wall surfaces of each of the first and second tubular portions, thus a securing and aligning thereof, wherein the biasing means comprise first and second threaded rods extending through first abutting side walls of the first and second tubular portions, the first and second threaded rods biasing a first wall surface of the elongate member against first inside surfaces of the abutting first and second tubular sections, and third and fourth threaded rods extending through a second side wall of the first and second tubular portions, the third and fourth threaded rods biasing a second wall surface of the elongate member against second inside surfaces of the abutting first and second tubular sections.

31. An apparatus according to claim 30, wherein the tubular portions have a generally uniform wall thickness such that aligning inside walls of the longitudinally abutting frame sections results in an aligning of outside surfaces thereof.

32. An apparatus according to claim 30, wherein the first wall surface of the elongate member is adjacent the second wall surface thereof.

33. An apparatus according to claim 30, wherein the first wall surface of the elongate member is adjacent the second wall surface thereof so as to form a corner therebetween.

34. An apparatus according to claim 30, wherein the first wall surface of the elongate member is perpendicular to the second wall surface thereof.

35. An apparatus according to claim 30, wherein the first inside wall surfaces of the first and second tubular portions are adjacent the second inside wall surfaces thereof.

36. An apparatus according to claim 30, wherein the first inside wall surfaces of the first and second tubular portions are perpendicular to the second inside wall surfaces thereof.

37. An apparatus according to claim 30, wherein each of the threaded rods comprise bolts, the bolts engaging threaded bores within the tubular portions.

38. An apparatus according to claim 30, wherein the elongate member is tubular.

39. An apparatus according to claim 38, wherein the elongate member and the first and second tubular portions have a rectangular cross section.

40. An apparatus according to claim 39, wherein the rectangular cross section comprises a square cross section.

41. An apparatus according to claim 30, further comprising:
the frame having a rectangular peripheral shape with the horizontal frame sections perpendicular to the vertical frame sections with each of the frame sections formed from rectangular tubing;
a corner bracket defining a corner edge for the frame, the corner bracket formed from rectangular tubing similar in shape to the frame sections, wherein the corner bracket connects the horizontal and vertical frame sections cooperating to from a corner of the frame;
a rod having a rectangular outside dimension for being received with the rectangular tubing of the corner bracket and the frame sections extends from the bracket to the frame section; and
biasing means biasing the rod against adjacent inside walls of the bracket and frame section adjacent tubing, thus providing alignment and attachment of the horizontal and vertical frame sections to the corner bracket.

42. An apparatus according to claim 41, wherein the corner comprises a squared corner.

43. An apparatus according to claim 30, further comprising:
a support;
a stringer member carried generally horizontally by the support, wherein the stringer member is aligned for defining a vertically oriented plane; and
a riser member attached to the stringer member and attached between the opposing horizontal frame sections, the riser member defining a flat riser member plane.

44. An apparatus according to claim 43, further comprising a clip carried by the riser member for attaching the riser member to the stringer members, wherein the riser member plane is aligned with the vertically oriented plane, thus securing the frame to the plurality of spaced, generally vertically arranged support posts with the flat plane being vertically oriented.

45. An apparatus according top claim 30, further comprising a flexible substrate extending across the periphery of the frame, wherein a message carrying surface of the flexible substrate faces outwardly from the front side of the frame.

46. A method of manufacturing a billboard sign, the method comprising:
providing a frame having opposing horizontal and vertical frame sections defining a periphery thereof, the front side of the frame defining a flat plane, the frame providing comprising:
providing first and second tubular portions for forming at least one of the horizontal and vertical frame sections;
positioning the first and second tubular portions for a longitudinally abutting relation for forming the at least one frame section, wherein each of the first and second tubular portions has a similar rectangular cross section;
extending an elongate member into the first and second tubular portions, the elongate member having a rectangular outside dimension;
extending the elongate member across abutting ends of the first and second tubular portions; and
biasing the elongate member against adjacent inside wall surfaces of each of the first and second tubular portions, thus a securing and aligning thereof, wherein the biasing comprises:
extending first and second threaded rods through first abutting side walls of the first and second tubular portions;
biasing a first wall surface of the elongate member against first inside surfaces of the abutting first and second tubular sections;
extending third and fourth threaded rods through a second side wall of the first and second tubular portions; and
biasing a second wall surface of the elongate member against second inside surfaces of the abutting first and second tubular sections;
attaching at least two riser members between the opposing horizontal frame sections such that the at least two riser members define a flat riser member plane;
attaching at least two stringer members to a support, and aligning the at least two stringer members for defining a vertically oriented plane; and
aligning the flat riser member plane with the vertically oriented plane, thus securing the frame to the support with the flat plane being vertically oriented.

47. A method according to claim 46, further comprising extending a flexible substrate across the periphery of the frame, wherein a message carrying surface of the flexible substrate faces outwardly from the front side of the frame.

48. A method according to claim 47, wherein the extending comprises extending a periphery of the flexible substrate across the periphery of the frame to a backside thereof.

49. A method according to claim 47, further comprising attaching a plurality of tensioning elements about the periphery of the frame and connecting the plurality of tensioning elements to the flexible substrate for a stressing thereof, thus providing a generally smooth planar message carrying surface defined by the frame.

50. A method according to claim 46, further comprising extending a plurality of posts downwardly into a supporting surface and upwardly along the back side of the frame for providing the support.

51. A method according to claim 46, wherein the frame comprises a rectangular peripheral shape with the horizontal frame sections perpendicular to the vertical frame sections with each of the frame sections formed from rectangular tubing, the method further comprising:
providing a corner bracket defining a corner edge for the frame, the corner bracket formed from rectangular tubing similar in shape to the frame sections;

inserting a rod having a rectangular outside dimension for being received within the rectangular tubing of the corner bracket and the frame sections extends from the bracket to the frame section;

connecting the corner bracket to the horizontal and vertical frame sections cooperating to from a corner of the frame; and biasing the rod against adjacent inside walls of the bracket and frame section adjacent tubing for providing alignment and attachment of the horizontal and vertical frame sections to the corner bracket.

* * * * *